United States Patent [19]

Yamakawa et al.

[11] Patent Number: 5,610,651
[45] Date of Patent: Mar. 11, 1997

[54] IMAGE FORMING APPARATUS WITH FREQUENCY CORRECTOR

[75] Inventors: Takeshi Yamakawa, Fujisawa; Takashi Mama; Kenichi Ono, both of Yokohama; Norio Michiie, Tokyo, all of Japan

[73] Assignee: Ricoh Company, Ltd., Tokyo, Japan

[21] Appl. No.: 242,446

[22] Filed: May 13, 1994

[30] Foreign Application Priority Data

May 13, 1993 [JP] Japan .................................. 5-136744

[51] Int. Cl.$^6$ .................................................. H04N 1/21
[52] U.S. Cl. ................................... 347/250; 347/235
[58] Field of Search ............................... 347/250, 235

[56] References Cited

U.S. PATENT DOCUMENTS 4,760,251  7/1988  Shimada et al. ...................... 358/493
4,951,065  8/1990  Okino ................................... 347/259
4,962,981  10/1990  Murakami et al. ..................... 358/296

FOREIGN PATENT DOCUMENTS 60-74767A  4/1985  Japan .
3-110512A  5/1991  Japan .

Primary Examiner—Mark J. Reinhart
Attorney, Agent, or Firm—Lowe, Price, LeBlanc & Becker

[57] ABSTRACT

A scanning time after a detection signal from a first laser beam detection sensor is inputted until a detection sensor from a second laser beam detection sensor is inputted by a counter, flip-flops, a corrected write frequency f1 is computed by a control circuit from a value T1 corresponding to the measured scanning time and a function F (T1) for computing a correction factor using the basic write frequency f0 and the value T1 above and through the equation of "f1=f0×F (T1)", and the write clock frequency is corrected by a clock generation circuit, thus the write clock frequency being controlled according to a change in the scanning speed.

22 Claims, 5 Drawing Sheets

IMAGE FORMING APPARATUS WITH FREQUENCY CORRECTOR

FIELD OF THE INVENTION

The present invention relates to an image forming apparatus which writes pictorial information into a photo-sensitive body using a laser beam, and more particularly to an image forming apparatus which uses at least two laser beam detecting means, means a scanning time or a count of specified blocks from a time when one of the laser beams detects a laser beam until another laser beam detecting means detects a laser beam, and corrects a write clock frequency based on the measure value.

BACKGROUND OF THE INVENTION

Conventional types of image forming apparatus include an image forming apparatus which writes pictorial information into a photo-sensitive body using a laser beam. In recent years, in the image forming apparatus as described above, a plastic lens has been used for such purposes as cost reduction or weight reduction.

Also in association with popularization or expansion of application scope of image forming apparatuses such as a laser printer, a laser facsimile equipment and a laser copier, a demand for capability for constant magnification (accuracy in variable power) has been becoming increasingly stronger. However, in an image forming apparatus using a conventional type of plastic lens therein, although reduction of cost and weight is possible, state of the plastic lens changes due to such factors as change of environmental temperature or temperature inside the machine, sometimes a scanning position on an image surface on a photo-sensitive body changes, which causes a magnification error in the main scanning direction and makes it impossible to obtain a high quality image. Especially in a copier which is required to execute precise magnification or reduction of an image, the capability for constant magnification (accuracy in variable power) becomes lower, which is disadvantageous.

SUMMARY OF THE INVENTION

It is an object of the present invention to obtain a high quality image having no difference in magnification (or keeping accuracy in variable power) without being affected by change in scanning speed caused due to influence by temperature change.

To achieve the object as described above, the present invention provides an image forming apparatus to write pictorial information into a photo-sensitive body using a laser beam comprising a plurality of laser beam detecting means each for detecting a laser beam moving in the main scanning direction, a measuring means for measuring a scanning time or a counting a number of specified clocks after one of the plurality of laser beam detecting means detects a laser beam until another one of the laser beam detecting means detects a laser beam, and a write frequency correcting means for correcting a write clock frequency by computing a corrected write frequency f1 through the equation of "f1=f0×F (T1)" based on the result of the measurement above and using a function $\underline{F}$ (T1) for computing a correction factor using the value T1 which corresponds to the scanning time or the count obtained in the measurement and the basic write frequency as parameters.

It should be noted that the specified clock above has a certain frequency. Also it should be noted that the certain frequency is a certain write clock frequency. Also it should be noted that the certain write frequency is a write frequency set up during initial correction, or that the certain write frequency is a basic clock frequency before correction.

Also it should be noted that the basic write frequency f0 described above is a write clock frequency set up during initial correction, or that the basic write frequency f0 is a basic write clock frequency before correction.

Also it should be noted that the function $\underline{F}$ (T1) for computing a correction factor using T1 as a parameter is expressed by an equation of "F (T1)=1/(1+α(T1−T0)/T0)" wherein T0 is a value corresponding to a basic scanning time or a count number and α is a specified factor.

In addition to the configuration described above, the image forming apparatus according to the present invention has a storage means for storing therein data corresponding to a scanning time or a count number after one of the plurality of laser beam detecting means detects a laser beam until another one detects a laser beam measured when the write clock frequency was corrected in the initial stage and data for generating the write frequency f1, and the value T0 corresponding to the basic scanning time or the count number is obtained from the scanning time or the count number stored in the storage means.

In addition to the configuration described above, the image forming apparatus according to the present invention has a storage means for storing data used to adjust an error generated when the write clock frequency is corrected in the initial stage, and in this case the function $\underline{F}$ (T1) for computing a correction factor using T1 as a parameter is expressed by the equation of "F (T1)=1/(1+α(T1−Td)/Td)" wherein Td is a value corresponding to the basic scanning time or a count number and α is a specified factor, and the write frequency correcting means computes Td from the data stored in the storage means and used for adjusting an error generated when the write clock frequency is corrected in the initial stage.

When an error is generated during an operation for correcting a write clock frequency, the write frequency correcting means sets up the basic write frequency f0 in the write clock frequency, and terminates the operation for correction. Or when an error is generated during an operation for correcting the write clock frequency, the write frequency correcting means specifies the write clock frequency corrected just before generation of the error as the write clock frequency, and terminates the operation for correction. Also the write frequency correcting means outputs an error message, if an error is generated, when the operation for correction ends.

A signal obtained from at least one of the plurality of laser beam detecting means is used as a laser beam scanning synchronizing signal (synchronous detection signal).

The write frequency correcting means executes correction of a write clock frequency when the image forming operation start button is depressed. Or the write frequency correcting means executes correction of a write clock frequency between frames when recording data continuously.

When the write frequency correcting means does not measure a scanning time nor count a number of clocks after one of the laser beam detecting means detects a laser beam until another one detects a laser beam, a laser beam is not emitted at a position or positions corresponding to at least one or more of the plurality of laser beam detecting means.

The image forming apparatus according to the present invention detects a change in scanning speed associated with a change in temperature inside the apparatus by measuring a scanning time or counting a number of clocks after one of a plurality of laser beam detecting means detects a laser beam until another one of the plurality of laser beam detecting means detects a laser beam with a measuring means, computes a corrected write frequency with the write frequency correcting means from T1 which is a value corresponding to the measured scanning time or number of clocks through a function "F(T1) of f1=f0×F (T1)" for computing a correction factor using the basic write frequency f0 and the value T1 above, and controls the write clock frequency according to a change in the scanning speed by correcting the write clock frequency.

As described above, the image forming apparatus according to the present invention detects a change in the scanning speed associated with change in temperature inside the apparatus by measuring a scanning time or a number of specified clocks after one of a plurality of laser beam detecting means detects a laser beam until another one detects a laser beam with a measuring means, computes a corrected write frequency f1 with the write frequency correcting means from the value T1 corresponding to the measured scanning time or the counted number of clocks and the function $\underline{F}$ (T1) for computing a correction factor using the basic write frequency f0 and the value T1 above as parameters and through the equation of "f1=f0×F (T1)", and controls the write clock frequency according to changes in the scanning speed by correcting the write clock frequency, so that high quality images can always be obtained maintaining the accuracy in isometric magnification (precision in magnification) without being affected by change in the scanning speed due to change in peripheral temperature.

Other objects and features of this invention will become understood from the following description with reference to the accompanying drawings.

DESCRIPTION OF THE PREFERRED EMBODIMENTS

Now detailed description is made for the image forming apparatus according to the present invention in the order of Embodiment 1, Embodiment 2, Embodiment 3, Embodiment 4, and Embodiment 5 with reference to the related drawings.

Figure 1:
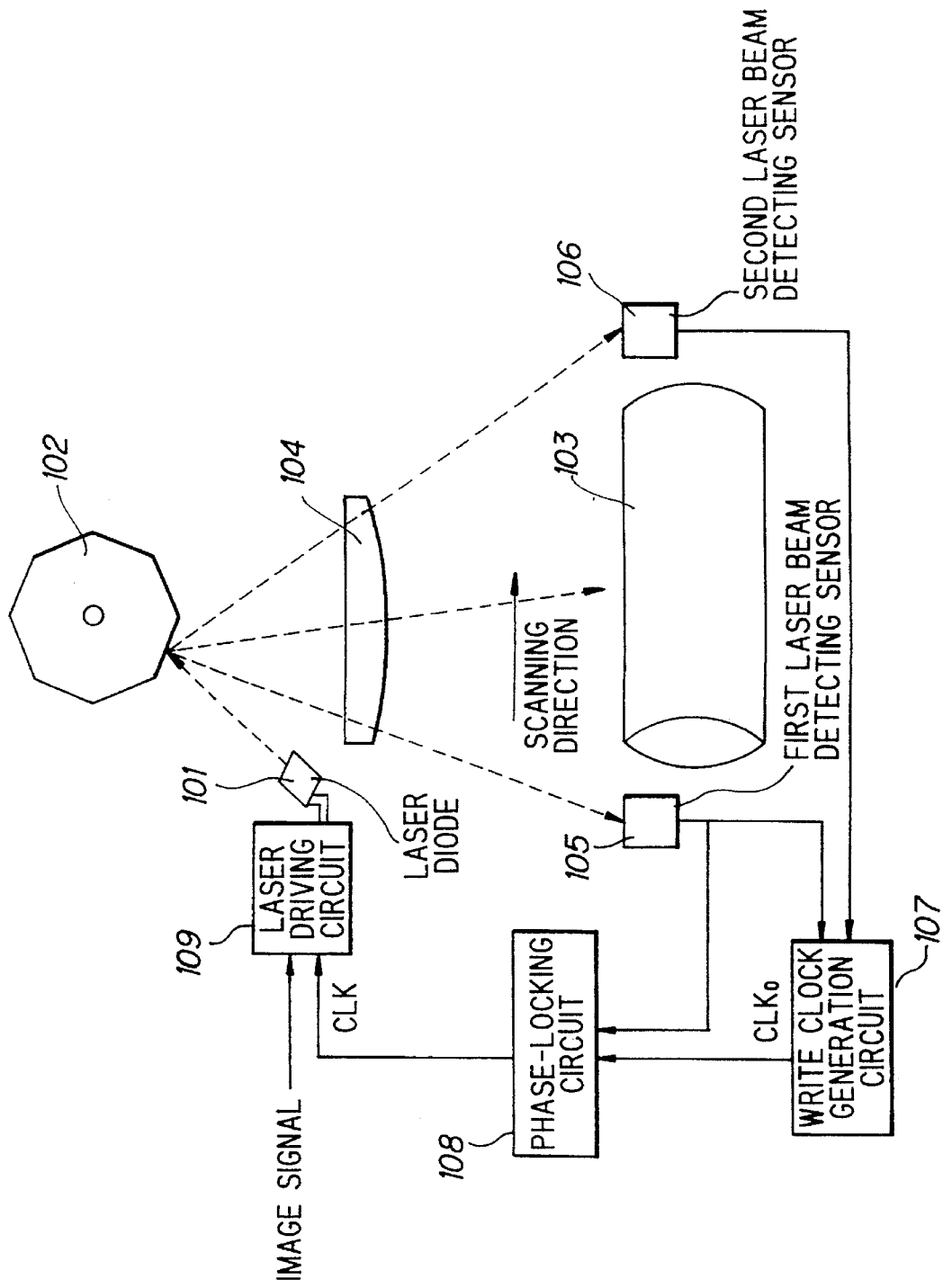
FIG. 1 is an explanatory view illustrating configuration of a write block of an image forming apparatus according to Embodiment 1.

FIG. 1 shows configuration of a write block of the image forming apparatus according to the first embodiment. A laser beam omitted from a laser diode 101 goes into a polygon mirror 102. The polygon mirror 102 has a cross section which is an accurate polygon, and rotates at a constant speed in one direction. This rotational speed is decided by a rotational speed of a photo-sensitive drum 103, a write density, and a number of faces of the polygon mirror 102.

A reflected light of the laser beams coming into the polygon mirror 102 is deflected by rotation of the polygon mirror 102. The deflected laser beam goes into an fθ lens 104. The fθ lens 104 is made of plastics because of its low cost and light weight, converts a scanning beam having a constant angular velocity so that the scanning beam scans the photo-sensitive drum 103 at a constant speed, forms an image at a place where a cross section of the scanning beam becomes minimum on the photo-sensitive drum 103, and furthermore has a face inclination correcting mechanism.

The laser beam passing through the fθ lens 104 at fist reaches a position of a first laser beam detecting sensor 105 provided outside of the image area, then passes through the photo-sensitive drum 103, reaches a second laser beam detecting sensor 106 provided outside the image area, and is received there respectively. Herein a first laser beam detecting sensor 105 and a second laser beam detecting sensor 106 are laser beams detecting means according to the present embodiment, and especially the first laser beam detecting sensor 105 also plays a role as a synchronism detecting sensor for detecting a laser beams scanning synchronizing signal (synchronism detecting signal).

When the first laser beam detecting sensor 105 and the second laser beam detecting sensor 106 receive a laser beam, the sensors output a detection signal DEPT1 and a detection signal DEPT2 to a write clock generation circuit 107 respectively.

The write clock generation circuit 107 measures a scanning time or a number of specified clocks after the first laser beam detecting sensor 105 detects a laser beam until the second laser beam detecting sensor 106 detects a laser beam according to the detection signals DEPT1 and DEPT2, computes the corrected write frequency f1 from the value T1 corresponding to the measured scanning time or the counted number of clocks and a function $\underline{F}$ (T1) for computing a correction factor using the basic write frequency f0 and the value T1 above as parameters and through the equation of "f1=f0×F (T1)", corrects the write clock frequency, and outputs a write clock $CLK_0$ based on the write clock frequency. It should be noted that then the write clock generation circuit 107 outputs a plurality of clocks as write clocks $CLK_0$ each having a different phase. Also the write clock generation circuit 107 may also be called magnification correcting circuit for correcting a write magnification because the circuits generates write clocks.

The write clocks $CLK_0$ outputted from the write clock generation circuit 107 are inputted into a phase-locking circuit 108. Also into the phase locking-circuit 108 is inputted a synchronism detection signal obtained for each scan by a laser beam from the laser beam detecting sensor 105.

The phase-locking circuit 108 selects a clock having a phase closest to a detection signal of write clocks $CLK_0$ each comprising a plurality of clocks each having a different phase, and outputs as a write clock CLK to a laser driving circuit 109.

On the other hand, the laser driving circuit 109 makes the laser diode 101 emit light in synchronism to the write clock CLK and according to an image signal (image data) for forming an image, and outputs a laser beam.

Figure 2:
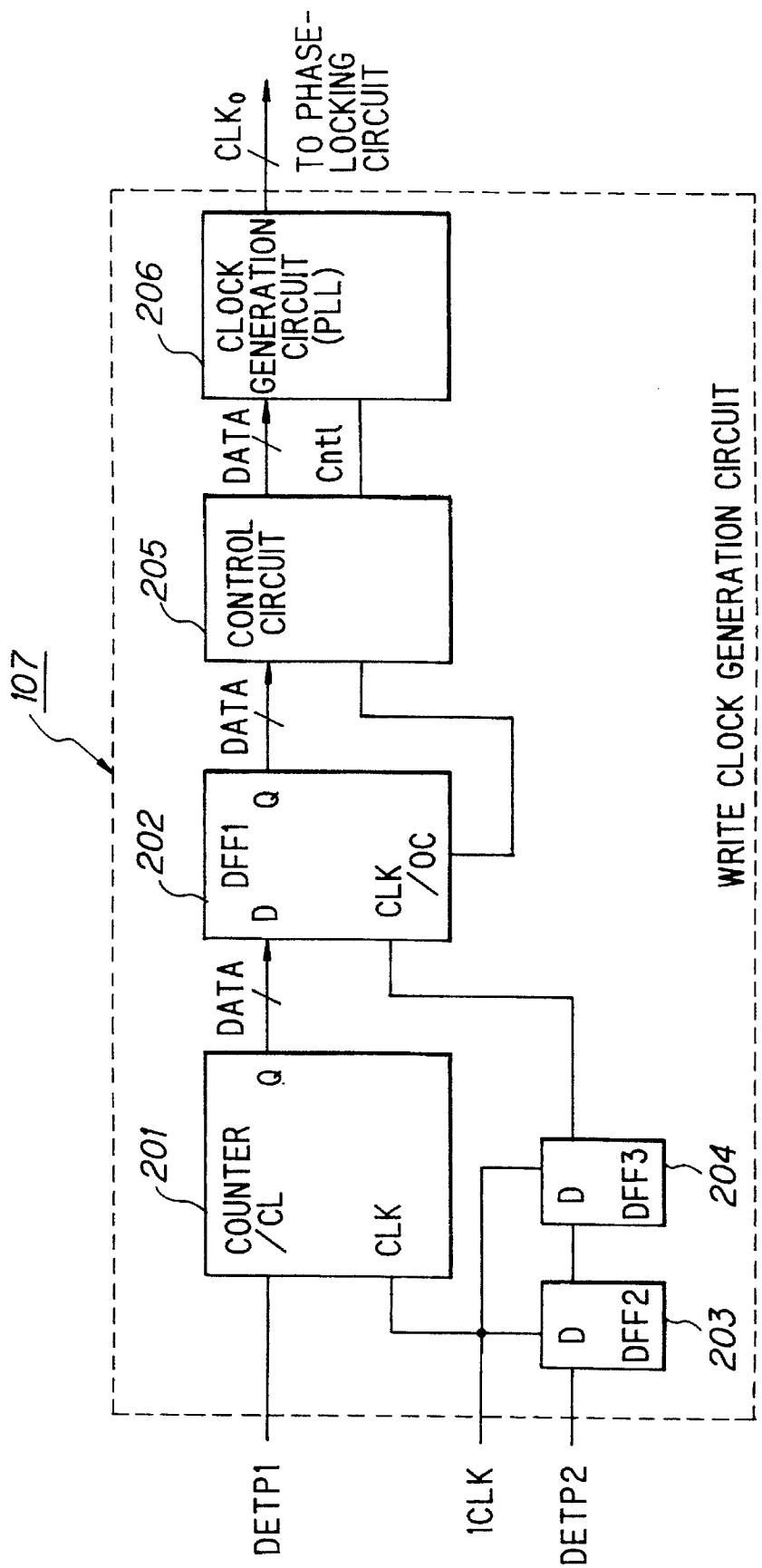
FIG. 2 is an explanatory view illustrating configuration of a write clock generating circuit.

FIG. 2 shows configuration of the write clock generation circuit 107, said write clock generation circuit 107 comprising a counter 201, flip-flops 202 to 203, a control circuit 205, and a clock generation circuit 206.

Figure 3:
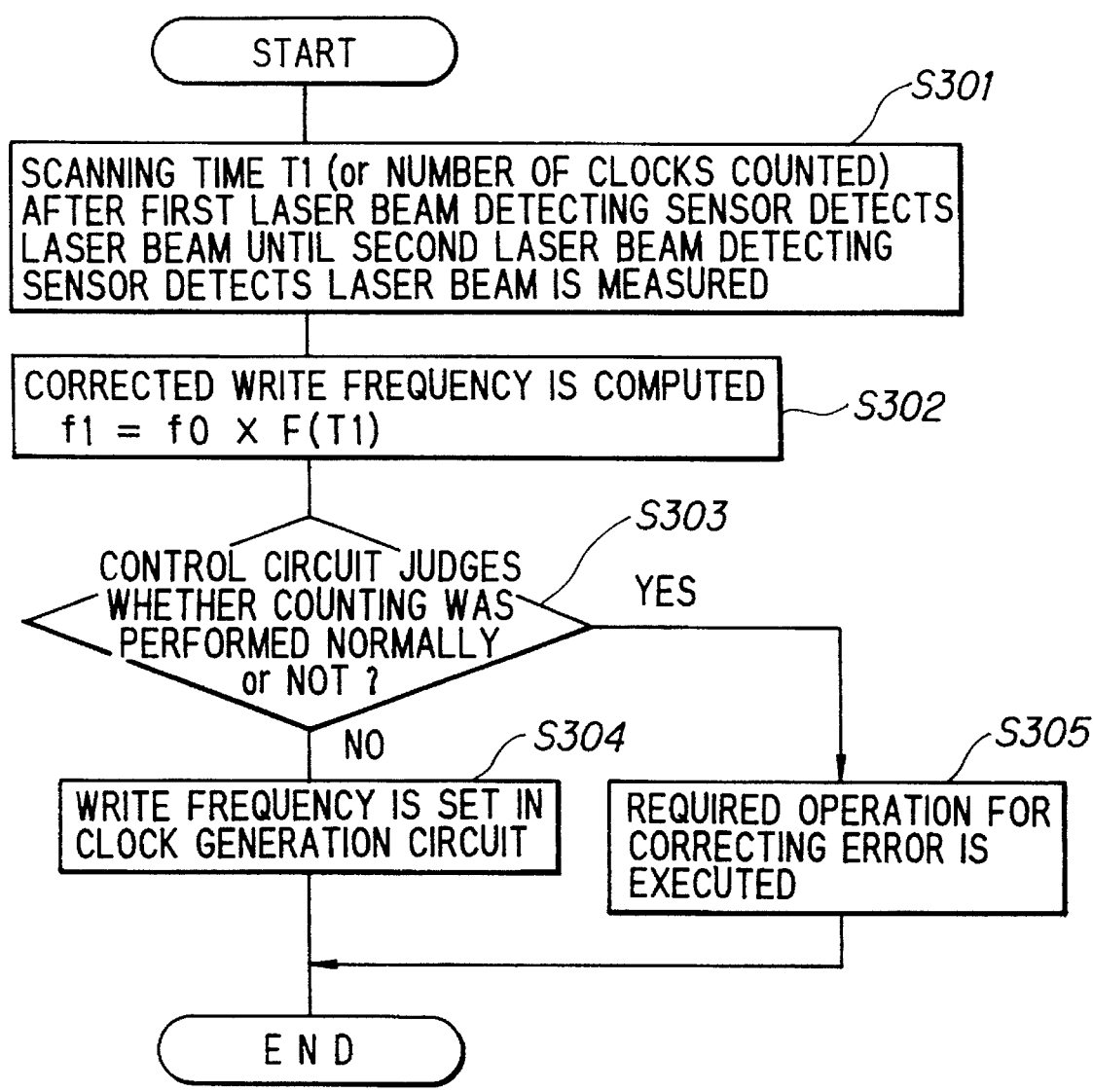
FIG. 3 is a flow chart of operations of a write clock generating circuit according to Embodiment 1.

With the configuration described above, now description is made for the operations with the reference to configuration of the write clock generation circuit 107 shown in FIG. 2 and the operational flow chart of the write clock generation circuit 107 shown in FIG. 3.

At first, in step S301, a scanning time T1 (or a number of clocks counted) after the first laser beam detecting sensor 105 detects a laser beam until the second laser beam detecting sensor 106 detects a laser beam is measured. Concretely, each portion shown in FIG. 2 works as described below. The counter 201 counts the inputted clocks CLK for measurement inputted, and is cleared when a detection signal DEPT1 from the first laser beam detecting sensor 105 is detected. The flip-flop (DEF1) 202 latches data from the counter 201 when the detection signal DEPT2 from the second laser beam detecting sensor 106 is detected. The latched data corresponds to the scanning time (DEPT1–DEPT2) after the first laser beam detecting sensor 105 detects a laser beam until the second laser beam detecting sensor 106 detects a laser beam. The flip-flop (DEF2) 203 and the flip-flop (DEF3) 204 is a circuit which synchronizes a timing for latching according to the detection signal DEPT from the second laser beams detecting sensor 106 to an input clock from the counter 201.

Then in step S302, the control circuit 205 sets a /OC signal from the flip-flop 202 from "H" to "L", reads the latched count, and computes a corrected write frequency f1 from the value T1 corresponding to the measured scanning time (count) and a function for computing a correction factor using the basic write frequency f0 and the value T1 above as parameters and through an equation of "f1=f0×F (T1)".

Then the control circuit 205 judges whether counting was performed normally or not when the count was read (S303), and if any error is detected (for instance, when the count is not correct), a required operation for correcting the error is executed (S305), if there is not error, a result of computing through the above equation of "f1=f0×F (T1)" is set in a clock generation circuit 206, and an operation for correcting the magnification is completed (S304). It should be noted that the clock generation circuit (PLL) 206 generates and outputs a plurality of clocks $CLK_0$ each having a different phase at a frequency corresponding to the data outputted from the control circuit 205.

Also when a scanning time between scans by at least 2 or more laser beam detecting sensors is measured by counting a number of clocks with a counter, if a frequency of input clock changes, processing of the count (judgment as to whether the operation is normal or abnormal, computing for correction etc.) becomes very complicated. For this reason, in Embodiment 1, a frequency of clocks when measuring (counting) a number of clocks (namely clocks ICLK for measurement) is adjusted to a certain frequency, so that work load to the control circuit is substantially reduced.

In a scanning optic system (write section) for forming an image by focusing a laser beam to be scanned onto an image recording surface of an image forming apparatus according to Embodiment 1 described above, if the optical characteristics changes due to some environmental reasons, the magnification can automatically be corrected. Also by previously storing corrected data during adjustment of magnification in the initial stage in the apparatus, it is possible to carry out initial magnification adjustment as well as time-to-time magnification adjustment with the same configuration.

If any error should occur during an operation for adjusting the magnification such as going out of the correction range or breakage of a laser beam detecting sensor and it becomes impossible to measure a scanning time or to adjust the magnification, the control circuit 205 detects the error, terminates the operation for correction, and in step S305 described above for correcting an error, the write clock frequency as a basis for correction (such as an initial magnification adjustment write clock frequency, or a write clock frequency computed from a theoretical value) is set up. With the above configuration, the apparatus is prevented from being unable to form an image, and the apparatus can keep running even during a period until the generated error is eliminated. However in case of an error making it impossible to form an image such as breakage of a synchronism detection system output means, the above mechanism does not work. In other words, when an error not giving fatal damages for forming an image is generated in correcting the magnification, system operation can be continued by the above mechanism.

On the other hand, when this type of error occurs, if the error is corrected inside the write clock generation circuit 107, control blocks at a higher position from the circuit do not recognize the error, and control the apparatus on the recognition that the image forming apparatus is in the normal condition. In contrast, when such an error occurs, contents of the generated error is given as a message to control blocks at a higher position from the circuit, the control blocks at a higher position can issue an alarm to an operator or a upper system and can rapidly take necessary measures to overcome the state. As described above, the apparatus can continue to work without substantially deteriorating the image quality until the error is solved.

A laser beam detecting sensor being used for measure a scanning time can obtain one detection signal to one light source for every main scanning so long as a laser is ON at a position of the laser beam detecting sensor. For this reason, as described above, by using a detection signal from the first laser beam detection sensor 105 as a synchronism detection signal for synchronizing a phase of each write clock or for generating a image record control signal, it is possible to use a laser beam detecting sensor for both measurement of a scanning time and detection of a synchronism detection signal, configuration of the apparatus becomes very simple, and also a number of required components can be reduced, which in turn makes it possible to reduce the cost.

Also the corrected write frequency f1 can generally be set according to any timing other than that for forming an image. However correction of a write clock (correction of magnification) in the present invention is performed for maintaining an image quality even if environmental conditions for this apparatus change, so that it is desirable to get timing for decision for the corrected write frequency f1 and that for setting the corrected write frequency f1 as closer to timing for forming an image as possible. When a timing for setting the corrected write frequency f1 is adjusted to that for pressing the start button, image formation is carried out just after the magnification is corrected, so that it is possible to maintain output of high quality images without being affected by time-to-time changes in environmental conditions. Or when a plurality of images (frames) are formed by pressing a start button only once, if a timing for setting the corrected write frequency f1 is adjusted to between frames in recording continuously, it is possible to prevent image quality from becoming lower due to such a reason as increase of peripheral temperature during continuous operation as well as to maintain output of high quality images.

Configuration and operations of Embodiment 2 are similar to those in Embodiment 1, but in Embodiment 2, when adjusting a frequency of clocks ICLK for measurement to a certain constant frequency, the certain constant frequency is a certain write clock frequency.

A plurality of clocks $CLK_0$ each having a different phase output from the write clock generation circuit 107 are inputted into the phase synchronizing circuit 108. Into the phase synchronizing circuit is inputted a synchronism detection signal obtained in each scan by a laser (a detection signal from the first laser beam detecting sensor 105), and of a plurality of clocks $CLK_0$ each having a different phase outputted from the write clock generation circuit 107 a clock having a phase closest to that of the synchronism detection signal is selected and outputted as a write clock CLK. For this reason it is possible to obtain a write clock having only a small phase error of clock in each scan by a laser (hereinafter the scanning (direction) by a laser is called main scanning (direction), and the direction rectangular to the laser scanning direction is called sub-scanning direction).

As described above, as in measurement of a scanning time after one laser beam detecting sensor detects a laser beam until another laser beam detecting sensor detects a laser beam for correction of magnification such operations as resetting a counter or data latch are executed, by using a constant write clock substantially synchronized to the synchronism detection signal in the main scanning direction as an input clock for the counter 201 shown in FIG. 2, it becomes possible to eliminate a count miss due to a phase delay between a detection signal from a laser bean detecting sensor and a clock as well as to execute measurement of a scanning time after one laser bean detecting sensor detects a laser beam until another laser bean detecting sensor detects a laser beam at a high precision. Also by measuring the scanning time using a write clock, even if recording conditions in the image forming apparatus change, a constant write clock corresponding to the recording conditions can be used, so that it is possible to reduce the requirements for changing the control circuit 205 as well as to provide an apparatus which can be used for various purposes.

Configuration and operations of Embodiment 3 are similar to those in Embodiment 1, but when a frequency of a clock ICLK for measurement is adjusted to a certain frequency, the certain frequency is the write clock frequency set up when initial correction was performed. Also as "the basic write frequency f0" to be used in the computing process by the control circuit 205, the write clock frequency set up when initial correction was carried out is used. Also as "the function $F$ (T1) for computing a correction factor using T1 as a parameter" to be used in the computing process by the control circuit 205, the function expressed by the equation of "F (T1)=1/(1+α(T1−T0)/T0)" is used wherein T0 is a value corresponding to the basic scanning time or a number of clocks and α is a specified coefficient.

The image forming apparatus according to the present invention has a memory (not shown) in which data measured when a write clock frequency is corrected in the initial stage and corresponding to a scanning time (count number) after a laser beam detecting sensor detects laser beam until another laser bean detects a laser beam and data used to generate the corrected write frequency f1 are stored, the write clock generation circuit obtains the value T0 corresponding to the basic scanning time (count number) from the data corresponding to the scanning time (count number) after one laser beam detecting means detects a laser beam until another laser beam detecting means detects a laser beam stored in the memory described above.

Figure 4:
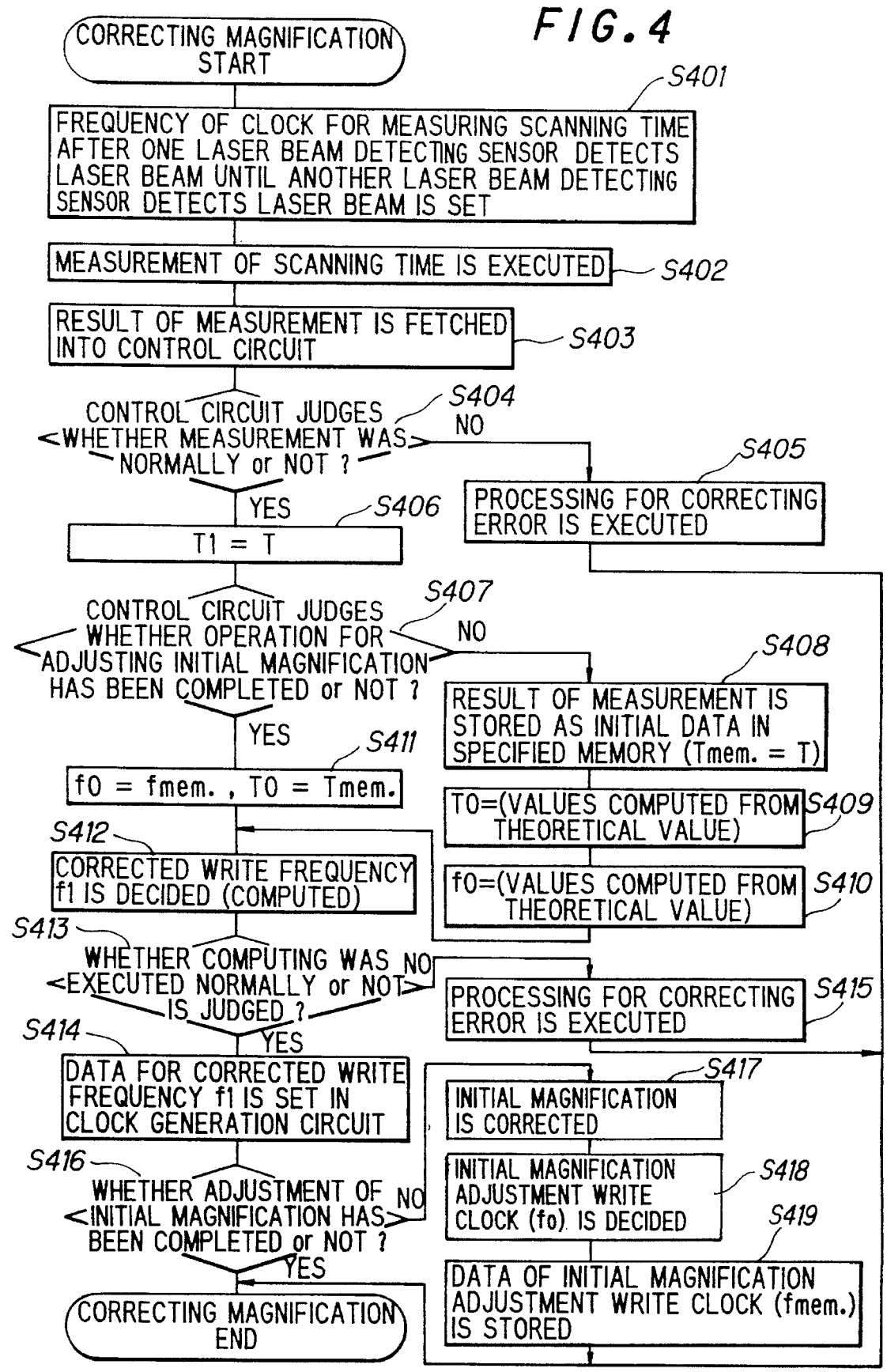
FIG. 4 is a flow chart of operations of a write clock generating circuit according to Embodiment 3.

Now description is made for operations of Embodiment 3 with reference to the flow charts in FIG. 2 and in FIG. 4.

At first in step S401, when an operation for correcting magnification is started, a frequency of the clock ICLK for measurement by the counter 201 for measuring a scanning time after one laser beam detecting means detects a laser beam until another laser beam detecting means detects a laser beam is set. For instance, if a write clock is used as the clock ICLK for measurement, a certain write clock frequency for measurement of the scanning time should be set up in the clock generation circuit 206 in FIG. 2.

When a frequency of the clock ICLK for measurement is set, measurement of the scanning time is executed (S402), and a result of the measurement is fetched into the control circuit (S403).

The control circuit 205 judges whether the measurement was executed normally or not (S404), and if any error is found, the system control goes to step S405, where a specified processing for correcting the error is executed, and the processing is terminated. If any error is not found, system control goes to step S406.

When the measurement data $T$ concerning the scanning time is fetched thereinto, the control circuit 205 sets the measurement data $T$ to a value T1 corresponding to the measured scanning time (count number) (S406), and judges whether an operation for adjusting the initial magnification has been completed or not (S407). If not completed, a result of the measurement is stored as the initial data (Tmem.) in a specified memory (not shown herein) (S408), and values computed from the conditions for forming an image, the time interval between laser beam detecting sensors, and a theoretical value for the image forming optical system are set up as the value T0 corresponding to the basic scanning time or the basic count and as the basic write frequency f0 respectively (S409, S410).

On the other hand, if adjustment of the initial magnification is over in step S407, values (fmem. and Tmem.) converted from the data stored during adjustment of the initial magnification in T0 and F0 or the stored data are set up (S411), and the corrected write frequency f1 is decided (computed) through equations of "f1=f0×F (T1)" and of "F (T1)=1/(1+α(T1−T0)/T0)" (S412). It should be noted that the data to be stored during adjustment of the initial magnification may not be a measured value, nor a clock count itself.

Herein the function $F$ (T1) expressed by the equation of "F (T1)=1/(1+α(T1−T0)/T0)" used for deciding (computing) the corrected write frequency F1 indicates an inverse number of magnification during an operation for correcting the magnification in the initial stage. A process for introducing this equation is described below.

To maintain a magnification at a constant value, the relation between a write clock $f$ and a scanning time $t$ must satisfy the equation (1):

$$f \times t = \text{Constant} \quad (1)$$

It has been confirmed that a relation between a magnification d and a scanning time t when a time interval between laser beam detecting sensors changes due to time-to-time changes in the environmental conditions (such as, for instance, a peripheral temperature) satisfies the equation (2) below:

$$d = \alpha \times t \quad (2)$$

wherein α is a correction factor (constant).

For this reason, a magnification error Δd can be computed from the equation (2) and as expressed in the equation (3):

$$\Delta d = \alpha \times (T1 - T0)/T0 \quad (3)$$

Furthermore the following equation (4) can be obtained from the equation (1) and the equation (3):

$$1/(1+\Delta d) = f1/f0 \qquad (4)$$

Thus it is possible to decide a corrected write frequency from the equation (3) and the equation (4) and using the equation of "F (T1)=1/(1+α(T1−T0)/T0)".

When a corrected write frequency is computed, then whether the computing was executed normally or not is judged from the result (S413), and if any error is not found, the data for the corrected write frequency f1 is set in the clock generation circuit 206 (S414), and if any error is found, a processing for correcting the error is executed, and the operation for correcting the magnification is terminated (S415).

When the data is set in the clock generation circuit 206, judgment as to whether adjustment of the initial magnification has been completed or not is executed again (S416). When completed, the operation for adjusting the magnification is terminated, and if not completed, the initial magnification is corrected, an initial magnification adjustment write clock is decided, the result is stored, and the operation for adjusting the magnification is terminated (S417, S418, S419).

When magnification adjustment is executed according to the procedure in Embodiment 3 as described above, correction is made assuming that the magnification just after correction of the initial magnification is 1, so that a high precision magnification correction can be executed by setting the basic write frequency f0 in the write clock frequency set up when correction was made in the initial stage. Also by using the write clock frequency set up when correction was made in the initial stage as a write clock frequency of a clock ICLK for measurement, it is possible to share the data set in the clock generation circuit 206, and for this reason the efficiency in an operation for correcting the magnification can be improved.

Furthermore deterioration of precision in correction of magnification due to a computing error can be prevented by providing a memory (not shown herein) in which data corresponding to a scanning time (count) after one laser beam detecting sensor detects a laser beam until another laser beam detecting sensor detects a laser beam measured when the write clock frequency is corrected in the initial stage and data for generating the corrected write frequency f1 are stored and computing the value T0 corresponding to he basic scanning time (count) from the data corresponding to the scanning time (count) after one laser beam detecting sensor detects a laser beam until another laser beam detecting means detects a laser beam, said data being stored in the memory described above.

Also in the operation for correcting the error in steps S405 and S415 above, if the write clock frequency is set in the write clock frequency decided just before generation of the error, substantial degradation of a quality of an image to be formed can be prevented so long as a substantial change in environmental conditions does not occur, unless a power for the apparatus is disconnected or the apparatus is reset to the initial state.

Configuration of Embodiment 4 is similar to that in Embodiment 1, but if a frequency of a clock ICLK for measurement is a certain frequency, the certain frequency is the basic write clock frequency before correction. Also as the "basic write frequency f0" used in computing in the control circuit 205, the basic write clock frequency before correction is used.

Furthermore the image forming apparatus according to the present invention has a memory (not shown herein) to store data therein for adjusting an error when the write clock frequency is corrected in the initial stage, and in this case the function F (T1) for computing a correction factor using the value T1 as a parameter is expressed by the equation of "F (T1)=1/(1+α(T1−Td)/Td)" wherein Td is a value corresponding to the basic scanning time or the basic count and α is a specified coefficient, and the write clock generation circuit 107 obtains the value Td above from the data for adjusting an error when the write clock frequency was corrected in the initial stage, said data being stored in the memory above.

Figure 5:
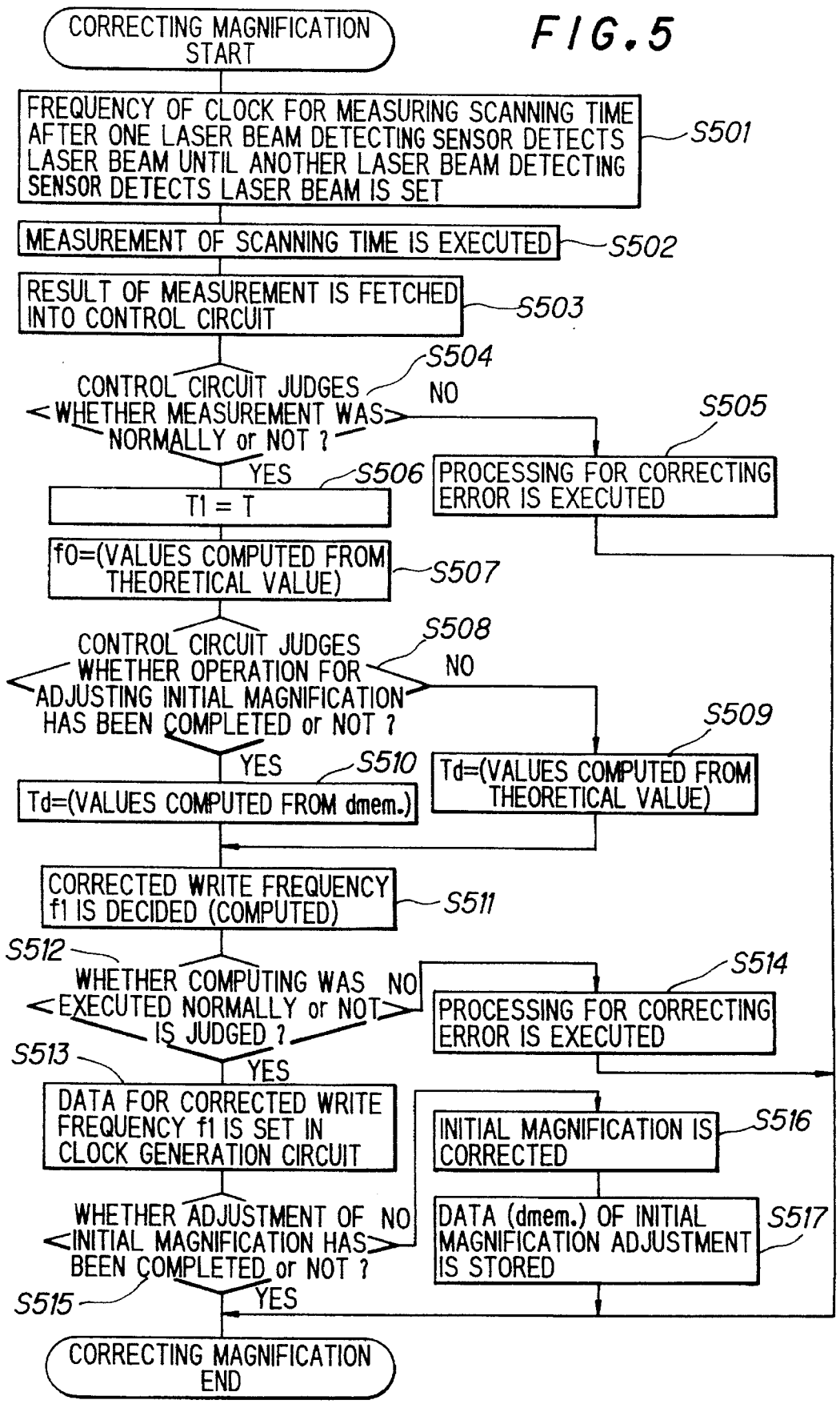
FIG. 5 is a flow chart of operations of a write clock generating circuit according to Embodiment 4.

Now description is made for operations in Embodiment 4 with reference to the flow charts shown in FIG. 2 and FIG. 5.

At first in step S501, when an operation for correcting the magnification is started, a frequency of the clock ICLK for measurement in the counter 201 which measures a scanning time after one laser beam detecting means detects a laser beam until another laser beam detecting means detects a laser beam is set. For instance, if a write clock is used as the clock ICLK for measurement, a certain write clock frequency for measuring a scanning time should be set in the clock generation circuit 206 shown in FIG. 2.

When the clock ICLK for measurement is set, measurement of the scanning time is executed (S502), and a result of the measurement is fetched into the control circuit 205 (S503).

In the control circuit 205, whether the measurement was made normally or not is judged (S504), and if any error is found, the system control goes to step S505, and a specified operation for correcting the error is executed, and then the operation for correcting the magnification is terminated. If any error is not found, the system control goes to step S506.

When the data concerning the scanning data is fetched into the control circuit 205, the control circuit 205 sets the measured data to a value T1 corresponding to the measured scanning time (count number)(S506), and also sets a value computed from the conditions for forming an image and a theoretical value for the image forming optical system in f0 (S507).

When setting values in T0 and f0 is over, whether adjustment of the initial magnification has been completed or not is judged (S508). If not completed, a value computed from the conditions for forming an image, a time interval between laser beam detecting sensors, and a theoretical value for the image forming optical system is set in Td which is used in the equation of "F (T1)=1/(1+α(T1−Td)/Td)" (S509). On the other hand, if adjustment of the initial magnification is completed, a value converted from the stored data (dmem.) when adjusting the initial magnification is set in Td (S510), the corrected write frequency f1 is decided (computed) using the equation of "f1=f0×F (T1)" and the equation of "F (T1)=1/(1+α(T1−Td)/Td)" (S511).

When the corrected write frequency f1 is computed, whether the computing was executed normally or not is judged from a result of the computing (S512), and if any error is not found, the data for the corrected write frequency f1 is set in the clock generation circuit 206 (S513), and if any error is found, an operation for correcting the error is executed, and the operation for correcting the magnification is terminated (S514).

When the data is set in the clock generation circuit 206, whether adjustment of the initial magnification has been completed or not is judged again (S515). If completed, the operation for correcting the magnification is terminated, and if not completed, data for adjustment to correct the initial magnification to "1", for instance, magnification error data before adjustment is stored, and the operation for correcting the magnification is terminated (S516, S517).

Herein the function F (T1) expressed by the equation of "F (T1)=1/(1+α(T1−Td)/Td)" used for deciding (computing) the corrected write frequency f1 expresses an inverse number of a magnification when the magnification in adjusting the initial magnification is assumed as "1" and that when the magnification is corrected.

In Embodiment 3 described above, f0 and T used in the equation for computing a correction factor for correcting the magnification are set from data previously stored respectively, but in Embodiment 4, only one piece of data is stored when the initial magnification is adjusted, and the data is converted to a parameter required for computing. For instance, when data corresponding to a magnification error before adjustment is stored in adjusting the initial magnification is easy to convert the scanning time (count number) after one laser beam detecting sensor detects a laser beam until another laser beam detecting means detects a laser beam when the initial magnification is adjusted and the initial magnification adjustment write clock frequency according to the magnification error data and the theoretical value using the equations (1) and (2) in Embodiment 3.

For this reason, even if a number of data to be stored during initial magnification adjustment is only "1", the magnification can be corrected, which makes it possible to reduce a memory capacity.

As described above, the system in Embodiment 4 is characterized in that parameters required for correction of a magnification are obtained by converting data fewer than the number of parameters, but if a number of parameters to be obtained is large, a computing error in conversion may become a cause for deterioration in a precision of correction. For this reason, by setting the basic write clock frequency before correction, namely a frequency computed from the conditions for forming an image and a theoretical value for the image forming optical system in the f0 used in the equation of "f1=f0×F (T1)", it becomes possible to reduce a number of parameters to be obtained, which makes it possible to prevent deterioration in a precision of correction.

By using a frequency computed from the conditions for forming an image and a theoretical value for the image forming optical system as the write clock frequency when measuring a scanning time after one laser beam detecting sensor detects a laser beam until another laser beam detecting sensor detects a laser beam, it becomes possible to share the data set in the clock generation circuit as well as to improve the efficiency in an operation for correcting the magnification.

Configuration of Embodiment 5 is similar to that in Embodiment 1, but when the write clock generation circuit 107 does not measure a scanning time or a number of clocks after one laser beams detecting sensor detects a laser beam until another laser beam detecting sensor detects a laser beam, at a position or positions corresponding to at least one (herein the second laser beam detecting sensor 106) more of the plurality of laser beam detecting sensors (herein two sensors) the laser does not emit light.

As described in Embodiment 1, a precision of correction in measurement of a scanning time after one laser beam detecting sensor detects a laser beam until another laser beam detecting sensor detects a laser beam, said measurement required for correcting a write clock, can be improved by executing measurement of the scanning time in correcting the magnification for the purpose of magnification correction. In FIG. 2, as a scanning time (a number of clocks counted by the counter 201) after one laser beam detecting sensor detects a laser beam until another laser beam detecting sensor detects a laser beam is measured by resetting the counter 201 according to a detection signal DEPT1 from the second laser beam detecting sensor 106 and latching the counter data according to a detection signal DETP2 from the second laser beam detecting sensor 106, so that, if it is not necessary to measure the scanning time other than in operating the magnification, it is not necessary for the detection signal to be inputted into the circuit shown in FIG. 2.

For this reason, when it is not necessary to measure a scanning time or a number of clocks after one laser beam detecting sensor detects a laser beam until another laser beam detecting sensor detects a laser beam, by making a laser not emit light at a position or positions corresponding to at least one or more laser beam detecting sensors to be used for measurement of a scanning time, unnecessary light emission from a laser can be prevented, and life of photoelectronic transfer elements used in a laser or a laser beam detecting sensor and of photo-sensitive material used for recording an image can be prolonged.

Furthermore in the configuration as shown in FIG. 2, if a detection signal DEPT2 from the second laser beam detecting sensor 106 is always being outputted (namely the laser is always emitting light at a position corresponding to a laser beam detecting sensor), if a timing for fetching a result of measurement into a control circuit when a write clock is corrected is simultaneous to the timing for outputting the detection signal DEPT2, the operation for fetching a result of measurement may not been executed normally. In such a case, it becomes necessary to carry out such a process as that for controlling the timing for fetching a result of measurement to synchronize it to the timing for outputting the detection signal DEPT2. So by making the laser no emit light at a position corresponding to the second laser beam detecting sensor 106, the above processing for adjusting the timing is not necessary, and a result of measurement can be fetched asynchronously, which in turn makes it possible to simplify the control circuit.

It should be noted that, although a plastic lens is used as the fθ lens 104 in Embodiments 1 to 5 above, a high quality image can be obtained even by using a general glass lens with the capability for isometric magnification (precision in magnification) and without being affected by change in a scanning speed due to change of peripheral temperature, and it is needless to say that the same effect as that when a plastic lens is used can be achieved. Also a number of laser beam detecting sensors is not always limited to two, and the same effect can be achieved by using two or more laser beam detecting means.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus for writing pictorial information into a photo-sensitive body using a laser beam, said image forming apparatus comprising:

a plurality of laser beam detectors, each for detecting a laser beam moving in a main scanning direction;

a measuring apparatus for measuring a scanning time or a number of specified clocks after one of said plurality of laser beam detectors detects a laser beam until another laser beam detector detects a laser beam; and a write frequency correcter for correcting a write clock frequency by computing a corrected write frequency f1 from a value T1 corresponding to said measured scanning time or said number of specified clocks counted by said measuring apparatus and a function F (T1) for computing a correction factor, using a basic write frequency f0 and said value T1 above as parameters in an equation of $f1=f0 \times F(T1)$.

2. An image forming apparatus according to claim 1, wherein said specified clock is at a certain frequency.

3. An image forming apparatus according to claim 2, wherein said certain frequency comprises a certain write clock frequency.

4. An image forming apparatus according to claim 3, wherein said certain write clock frequency comprises a write clock frequency set up when a write clock frequency is corrected in an initial state.

5. An image forming apparatus according to claim 3, wherein said certain write clock frequency comprises a basic write clock frequency before correction.

6. An image forming apparatus according to claim 1, wherein said basic write frequency f0 comprises a write clock frequency when said write clock frequency is corrected in an initial stage.

7. An image forming apparatus according to claim 1, wherein said basic write frequency f0 comprises a basic write clock frequency before correction.

8. An image forming apparatus according to claim 1, wherein said function F (T1) for computing a correction factor using said value T1 as a parameter is expressed by an equation of $F(T1)=1/(1+\alpha(T1-T0)/T0)$, wherein T0 is a value corresponding to a basic scanning time or a number of clocks counted and $\alpha$ is a specified coefficient.

9. An image forming apparatus according to claim 8, wherein said image forming apparatus further has a memory for storing therein data corresponding to a scanning time of a number of specified clocks measured when a write clock frequency is corrected in an initial stage as well as data for generating said corrected write frequency f1 and wherein said corrected write frequency corrector obtains said value T0 corresponding to said basic scanning time or said number of specific clocks counted from a data corresponding to a scanning time or a number of clocks counted after one laser beam detector detects a laser beam until another one detects a laser beam, said data being stored in said memory.

10. An image forming apparatus according to claim 1, wherein said image forming apparatus further has a memory for storing data used to adjust an error when said write clock frequency is corrected in an initial stage and wherein the function F (T1) for computing a correction factor using said value T1 as a parameter is expressed by an equation of $F(T1)=1/(1+\alpha(T1-Td)/Td)$, wherein Td is a value corresponding to said basic scanning time or said number of specified clocks and said write frequency corrector obtains said value Td above from data for adjusting an error when said write clock frequency is corrected in an initial stage, said data being stored in said memory.

11. An image forming apparatus according to claim 1, wherein said write frequency corrector sets said basic write frequency f0 in said write clock frequency and terminates correction when any error is generated during an operation for correcting said write clock frequency.

12. An image forming apparatus according to claim 1, wherein said write frequency corrector decides said write clock frequency corrected just before generation of an error in the write clock frequency and terminates correction when any error is generated during an operation for correcting said write clock frequency.

13. An image forming apparatus according to claim 11, wherein said write frequency corrector outputs an error message when terminating correction if said error is generated.

14. An image forming apparatus according to claim 12, wherein said write frequency corrector outputs an error message when terminating correction if said error is generated.

15. An image forming apparatus according to claim 1, wherein a signal obtained from at least one of said plurality of laser light detectors is used as a laser beam scan synchronism detection signal.

16. An image forming apparatus according to claim 1, wherein said write frequency corrector corrects said write clock frequency each time a start button to start an operation for forming an image is pressed.

17. An image forming apparatus according to claim 1, wherein said write frequency corrector corrects said write clock frequency between frames during a scanning operation for continuously recording a plurality of frames.

18. An image forming apparatus according to claim 1, wherein, when said measuring apparatus does not measure a scanning time or a number of specified clocks after one laser beam detector detects a laser beam until another laser beam detector detects a laser beam, said laser does not emit light at a position or positions corresponding to at least one or more of said plurality of laser beam detectors.

19. An image forming apparatus according to claim 1, wherein said measuring apparatus comprises a counter and a plurality of flip-flops and said write frequency corrector comprises a control circuit and a phase locked loop clock circuit.

20. An image forming apparatus according to claim 1, further comprising a plastic lens and wherein said write frequency is corrected when said apparatus uses said plastic lens to variably magnify or reduce the size of a formed image.

21. An image forming apparatus according to claim 1, wherein said measuring apparatus measures said scanning time or said number of specified clocks during a scanning operation and said write frequency corrector computes a corrected write frequency from a value corresponding to said measured scanning time or said number of specified clocks measured by said measuring apparatus during said scanning operation.

22. An image forming apparatus according to claim 1, wherein said measuring apparatus repeatedly measures said scanning time or said number of specified clocks at a number of different times during a scanning operation and said write frequency corrector changes the write frequency said number of different times on the basis of a value corresponding to the most recently measured scanning time or said number of specified clocks measured by said measuring apparatus.

* * * * *